(12) United States Patent
Yang

(10) Patent No.: US 8,750,911 B2
(45) Date of Patent: Jun. 10, 2014

(54) CONTENT SOURCE, CONTENT SINK, AND METHOD FOR NATIVELY MANAGING AND DELIVERING ACTIVE CONTENT FROM ONE OR MORE CONTENT SOURCES TO ONE OR MORE CONTENT SINKS WIRELESSLY

(76) Inventor: Jianchong Yang, Issaquah, WA (US)

( * ) Notice: Subject to any disclaimer, the term of this patent is extended or adjusted under 35 U.S.C. 154(b) by 321 days.

(21) Appl. No.: 13/241,623

(22) Filed: Sep. 23, 2011

(65) Prior Publication Data

US 2013/0078904 A1 Mar. 28, 2013

(51) Int. Cl.
*H04B 7/00* (2006.01)
*G06F 3/14* (2006.01)
*G06F 3/13* (2006.01)

(52) U.S. Cl.
CPC ............ *G06F 3/1454* (2013.01); *G06F 3/1462* (2013.01); *G06F 3/13* (2013.01)
USPC ........ 455/500; 455/566; 455/550.1; 455/418; 455/420; 345/1.1; 345/2.1; 345/2.3

(58) Field of Classification Search
CPC ....... G06F 3/1454; G06F 3/1462; G06F 3/13; G06F 3/66
USPC ........... 455/500, 566, 550.1, 517, 422.1, 403, 455/426.1, 426.2, 445, 575.1, 90.3, 90.1, 455/418–420; 345/1.1, 2.1, 2.3
See application file for complete search history.

(56) References Cited

U.S. PATENT DOCUMENTS

| | | | |
|---|---|---|---|
| 2004/0239701 A1* | 12/2004 | Crichton ........................ | 345/853 |
| 2006/0236250 A1* | 10/2006 | Gargi ............................ | 715/753 |
| 2010/0321402 A1* | 12/2010 | Han et al. ..................... | 345/619 |
| 2012/0250576 A1* | 10/2012 | Rajamani et al. ............. | 370/254 |

* cited by examiner

*Primary Examiner* — Keith Ferguson
(74) *Attorney, Agent, or Firm* — Edell, Shapiro & Finnan, LLC

(57) ABSTRACT

A content source, a content sink, and a method for natively managing and delivering active content are provided. The content source wirelessly exchanges management information with the content sink, identifies and manages the content sink, and transmits active content to the content sink whereby the content sink displays the active content.

37 Claims, 10 Drawing Sheets

| sub-screen area 1 | sub-screen area 2 | sub-screen area 3 | sub-screen area 4 |
|---|---|---|---|
| sub-screen area 5 | sub-screen area 6 | sub-screen area 7 | sub-screen area 8 |
| sub-screen area 9 | sub-screen area 10 | sub-screen area 11 | sub-screen area 12 |
| sub-screen area 13 | sub-screen area 14 | sub-screen area 15 | sub-screen area 16 |
| sub-screen area 17 | sub-screen area 18 | sub-screen area 19 | sub-screen area 20 |

Fig. 5

CONTENT SOURCE, CONTENT SINK, AND METHOD FOR NATIVELY MANAGING AND DELIVERING ACTIVE CONTENT FROM ONE OR MORE CONTENT SOURCES TO ONE OR MORE CONTENT SINKS WIRELESSLY

BACKGROUND OF THE INVENTION

1. Field of the Invention

The invention relates to a content source, a content sink, and a method for natively managing and delivering active content from one or more content sources to one or more content sinks wirelessly.

2. Description of the Related Art

Electronic mobile devices such as smart phones and tablet devices are becoming more popular and powerful these days. The mobile devices are able to handle wide range of complex tasks including games, multi-media applications, web surfing and etc. There are several methods today that allow active screen content of a mobile device to be delivered and displayed on a remote content sink such as an electronic screen. For example, a projector with a connected docking station enables screen content of a docked mobile device to be projected to a remote surface. There are electronic transmitting devices on market that, via docking station or wire dongle, delivers active content of a docked or connected mobile device wirelessly to a remote electronic screen, via a paired electronic receiver connected. Other technologies, such as WiDi, allows a laptop computer equipped with WiDi implementation deliver content wirelessly to a remote TV screen that is also WiDi enabled. Some of the methods mentioned do not provide native solution for wireless content delivery between mobile device and content sink. None of the methods above is able to manage wireless mobile content delivery involving multiple mobile devices and content sinks, nor able to manage wireless mobile content delivery and displaying involving sub-portion of mobile content and or sub-portion of display area of content sinks.

BRIEF SUMMARY OF THE INVENTION

The invention provides a method for natively managing and delivering active content (visual content with or without audio) from at least one content source to at least one content sink. The received active content is then displayed on or played by the content sink natively. The co-operation of the content source and content sink is aware of the orientation of the content source so that the active content received by the content sink is displayed accordingly. The invention enables active content of a content source, with or without audio content, to be delivered wirelessly to multiple content sinks with each content sink displaying the same copy of the source content, or each content sink displaying part of the active content with multiple content sinks forming a complete copy of the active content. With the invention, multiple content sources may manage to deliver their active content to one remote content sink wirelessly with active content (visual) of each content source sharing the screen area of the content sink. Active content (visual) from multiple content sources may also be delivered wirelessly to multiple content sinks and share the screen area, in any geometry shape, that is formed by multiple content sinks. With the invention, portion of active (visual) content may be delivered to one or more content sinks. Also with this invention, portion of screen area, in any geometry shapes, of content sinks may be used for displaying active (visual) content received.

The method in accordance with an exemplary embodiment of the invention includes the steps of providing a content source which has a source screen area; providing a content sink which has a first sink sub-screen area and a second sink sub-screen area; wirelessly exchanging management information between the content source and the content sink, for the content source to identify and manage the content sink via the management information and for the sink to co-operate with the source and manage content received from the source; choosing the first sink sub-screen area by the content source; transmitting first active content from the content source to the content sink; and displaying the first active content on the first sink sub-screen area.

In another exemplary embodiment, the method further includes the step of establishing coordination mapping between the source screen area and the first sink sub-screen area before the first active content is transmitted to the content sink.

In yet another exemplary embodiment, the method further includes the step of establishing coordination mapping between the first active content and the first sink sub-screen area before the first active content is transmitted to the content sink.

In another exemplary embodiment, the method further includes the step of choosing the second sink sub-screen area by the content source, transmitting second active content from the content source to the content sink, and displaying the second active content on the second sink sub-screen area.

In yet another exemplary embodiment, the management information includes an orientation of the content source.

The invention also provides a method. The method in accordance with an exemplary embodiment of the invention includes the steps of providing a content source which has a plurality of source sub-screen areas; providing a content sink which has a sink screen area including a plurality of sink sub-screen areas; wirelessly exchanging management information between the content source and the content sink, for the content source to identify and manage the content sink via the management information and for the sink to co-operate with the source and manage content received from the source; generating active content by the content source; dividing the active content into a first section content that is showing on a first source sub-screen section and a second section content that is showing on a second source sub-screen section; and displaying the first section content of the active content on the content sink.

In another exemplary embodiment of the invention, the method further includes the step of establishing coordination mapping between one of the source sub-screen areas and the sink screen area via the management information.

In yet another exemplary embodiment of the invention, the method may further includes the step of establishing coordination mapping between the section of the active content that is showing on one of the source sub-screen areas and the sink screen area.

In another exemplary embodiment of the invention, the method further includes the step of choosing one of the sink sub-screen areas by the content source, and displaying the first section of the active content on the chosen one of the sink sub-screen areas.

In yet another exemplary embodiment of the invention, the method further includes the step of establishing coordination mapping between one of the source sub-screen areas and the chosen one of the sink sub-screen areas.

In another exemplary embodiment of the invention, the method may further includes the step of establishing coordination mapping between the section of the active content that is showing on one of the source sub-screen areas and the chosen one of the sink sub-screen areas.

In yet another exemplary embodiment of the invention, the management information includes an orientation of the content source.

The invention also provides a system includes a content source and a content sink. The content source in accordance with an exemplary embodiment of the invention includes a wireless transceiver unit, a remote display management unit, a content processing unit, and a source content management unit, among other general units may be required to operate the content source. The remote display management unit exchanges management information with a plurality of content sinks through the wireless transceiver unit to identify and manage the content sinks. The content processing unit processes active content. The source content management unit relies on the management information and manages the content processing unit to process the active content. The processed active content is transmitted to the content sinks through the wireless transceiver unit.

In another exemplary embodiment of the invention, the content sinks include sink screen areas, and the remote display management unit selects and reserves at least one of the content sinks and at least one of the sink screen areas (or sub-screen area) via the management information.

In yet another exemplary embodiment of the invention, the remote display management unit sets coordination mapping between the active content (or a source screen area or a source sub-screen area) and the at least one of the sink screen areas via the management information.

In another exemplary embodiment of the invention, the remote display management unit releases the reserved at least one of the sink screen areas via the management information.

In yet another exemplary embodiment of the invention, the content sinks include a plurality of sink sub-screen areas, and the remote display management unit selects and reserves at least one of the sink sub-screen areas via the management information.

In another exemplary embodiment of the invention, the remote display management unit sets coordination mapping between the active content (or source screen area or source sub-screen areas) and the at least one of the sink sub-screen areas via the management information.

In yet another exemplary embodiment of the invention, the remote display management unit releases the reserved at least one of the sink sub-screen areas via the management information.

In another exemplary embodiment of the invention, the management information includes an orientation of the active content.

In yet another exemplary embodiment of the invention, the content sinks form a display wall, and the management information includes locations of the content sources or source content sections within display wall composition.

In another exemplary embodiment of the invention, the content processing unit divides the active content into a plurality of sections, and the sections of the active content are transmitted to at least one of the content sinks through the wireless transceiver unit.

In yet another exemplary embodiment of the invention, the wireless transceiver unit includes a transceiver exchanging the management information with the content sinks, and a transmitter or a transceiver transmitting the active content to the content sinks.

In another exemplary embodiment of the invention, the content source is a mobile phone, a tablet computer, a laptop computer, or any other mobile device.

The content sink in accordance with an exemplary embodiment of the invention includes a wireless transceiver unit, a content source and display management unit, a content processing unit, and a content display management unit among other general units may be required to operate the content sink. The content source and display management unit exchanges management information with a plurality of content sources through the wireless transceiver unit, for the content sources to identify and manage the content sink, and for the sink to co-operate with the sources and manage content received from the sources. The content processing unit receives active content from the content sources through the wireless transceiver unit. The content display management unit relies on the management information and manages the content processing unit to process and format the active content.

In another exemplary embodiment of the invention, the content sink further includes a sink screen area, wherein the content source and display management unit enables the content sources to select and reserve the sink screen area via the management information.

In yet another exemplary embodiment of the invention, the content source and display management unit enables the content sources to set coordination mapping between the active content (or source screen area or source sub-screen area) and the sink screen area via the management information.

In another exemplary embodiment of the invention, the content source and display management unit enables the content sources to override the reserved sink screen area via the management information.

In yet another exemplary embodiment of the invention, the content sink further includes a plurality of sink sub-screen areas, and the content source and display management unit enables the content sources to select and reserve the sink sub-screen areas via the management information.

In another exemplary embodiment of the invention, the content source and display management unit enables the content sources to set coordination mapping between the active content (or source screen area or source sub-screen areas) and the sink sub-screen areas via the management information.

In yet another exemplary embodiment of the invention, the content source and display management unit enables the content sources to override the reserved sink sub-screen areas via the management information.

In another exemplary embodiment of the invention, the management information includes an orientation of the active content.

In yet another exemplary embodiment of the invention, the content processing unit divides the active content into a plurality of sections.

In another exemplary embodiment of the invention, the wireless transceiver unit includes a transceiver exchanging the management information with the content sources, and may be a separate receiver or a separate transceiver receiving the active content from the content sources.

In yet another exemplary embodiment of the invention, the content sink is an electronic display or a projector.

The invention also provides a method. The method in accordance with an exemplary embodiment of the invention includes the steps of wirelessly exchanging first management information between a content source and a first content sink, for the content source to identify and manage the first content sink via the first management information; transmitting first active content from the content source to the first content sink; displaying the first active content on the first content sink; wirelessly exchanging second management information between the content source and a second content sink, for the content source to identify and manage the second content sink via the second management information; transmitting second active content from the content source to the second content sink; and displaying the second active content on the second content sink.

The invention also provides a method. The method in accordance with an exemplary embodiment of the invention includes the steps of providing a content sink which comprises a first sink sub-screen area and a second sink sub-screen area; wirelessly exchanging first management information between a first content source and the content sink, for the first content source to identify and manage the content sink via the first management information; choosing the first sink sub-screen area by the first content source; transmitting first active content from the first content source to the content sink; displaying the first active content on the first sink sub-screen area of the content sink; wirelessly exchanging second management information between a second content source and the content sink, for the second content source to identify and manage the content sink via the second management information; choosing the second sink sub-screen area by the second content source; transmitting second active content from the second content source to the content sink; and displaying the second active content on the second sink sub-screen area of the content sink.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 depicts the sub-screen areas of a display device of the first application example of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
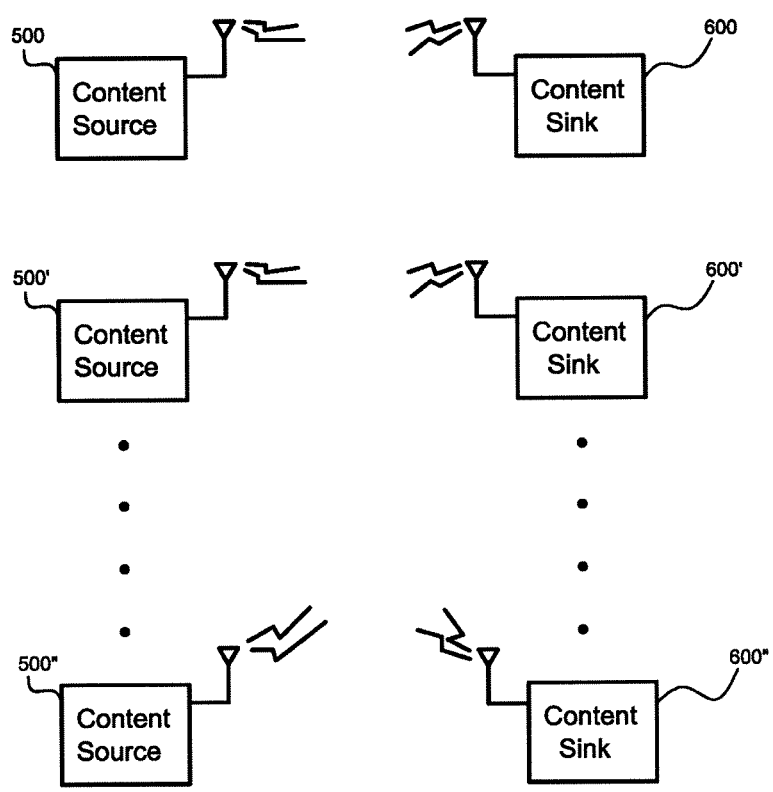
FIG. 1 depicts a system for natively managing and delivering active content in accordance with an embodiment of the invention.

Referring to FIG. 1, a system for natively managing and delivering active content in accordance with an embodiment of the invention includes one or more content sources 500, 500' and 500" and one or more content sinks 600, 600' and 600", wherein the content sources 500, 500' and 500" wirelessly deliver active content (e.g. video with or without audio) to the content sinks 600, 600' and 600". The content sources 500, 500' and 500" may be smart phones, tablet computers, notebook computers, or other electronic mobile devices. The content sinks 600, 600' and 600" may be electronic displays, projectors, etc. For easy descriptions, only the content source 500 and the content sink 600 are selected and shown in FIG. 2 and FIG. 3 for describing the embodiment of the invention. It is understood, however, that the other content sources 500' and 500" and content sinks 600' and 600" have similar structures as the content source 500 and the content sink 600.

Figure 2:
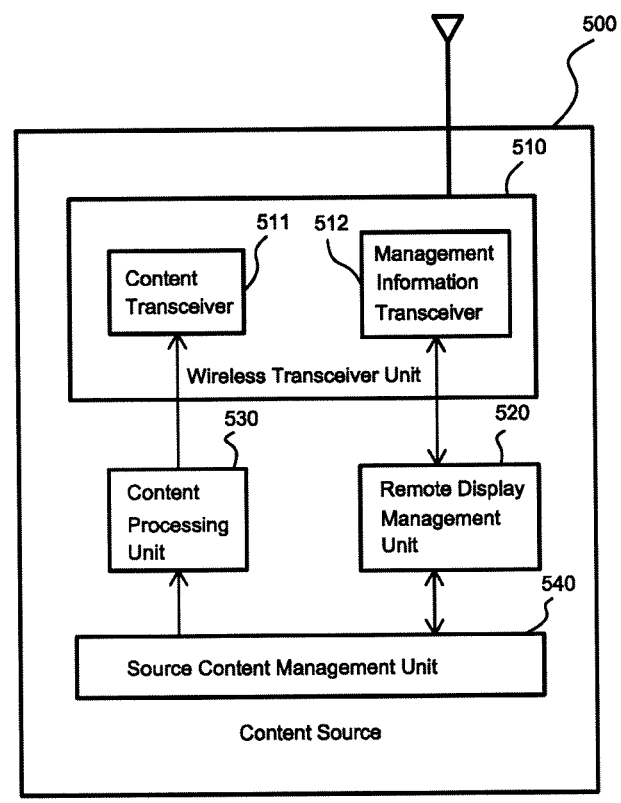
FIG. 2 is a block diagram of a content source of the system of FIG. 1.

Referring to FIG. 2, the content source 500, in addition to the normal components that operate the content source 500, includes a wireless transceiver unit 510, a remote display management unit 520, a content processing unit 530, and a source content management unit 540, described in the following:

The wireless transceiver unit 510 includes a content transceiver 511 and a management information transceiver 512. The content transceiver 511 performs transmitting active content encoded by the content processing unit 530 in appropriate industry medium standards to the content sinks 600, 600' and 600". The management information transceiver 512 performs exchanging management information with the content sinks 600, 600' and 600" using appropriate information exchange standards or protocols. The management information exchanged between the content source 500 and the content sinks 600, 600' and 600" may be point-to-point. All content sinks 600, 600' and 600" managed by the content source 500 may receive the same content, wherein each managed content sink 600 (600' and 600") displays the whole or portion of the content received according to the management information exchanged with the content sources 500. Alternatively, the content transceiver 511 may transmit different portions of the active content (generated by the content processing unit 530) to different content sink 600, 600' and 600" which are managed by the content source 500. Each managed content sink 600 (600' and 600") receives different portion of the active content and displays it according to the management information exchanged with the content source 500.

The wireless transceiver unit 510 described above does not restrict and limit how management information is delivered or exchanged wirelessly, nor restrict what wireless standards or protocol is used. For example, one exemplary implementation may select a current appropriate industry standard, such as WiDi, for delivering active content. The wireless transceiver unit 510 may include a content transmitter rather than the content transceiver 511 for delivering the active content. That is, the wireless transceiver unit 510 may include a content transmitter (replacing the content transceiver 511) for delivering active content and a management information transceiver 512 for exchanging management information that use different wireless channels (e.g. RF frequency).

The remote display management unit 520 exchanges management information with the content sinks 600, 600 and 600" via appropriate information exchange standards or protocols. The management information supports a set of communication functions that enables the content source 500 to identify, manage, and control the content sinks 600, 600 and 600" and how active content to be delivered, including but not limit to followings:

discovering active supporting content sinks near-by;
discovering active supporting content sources near-by;
selecting and reserving available content sinks and sink screen areas discovered;
communicating and selecting available sink sub-screen areas when applicable;

communicating and setting desired coordination mapping between the source content (or sections of source content) and the sink screen area (or sink sub-screen areas);

communicating content source capabilities with content sinks which may include but not limit to wireless protocols supported, communication security protocols supported, source screen and source content dimension and resolutions supported, source content (audio/visual) media format and compression protocols supported, and source sub-screen area supported;

communicating content sink capabilities which may include but not limit to wireless protocols supported, communication security protocols supported, sink screen and source content dimension and resolutions supported, source content (audio/visual) media format and compression protocols supported, and sink sub-screen area supported;

communicating the orientation of active source content to be delivered and being delivered;

performing communicational and audio/video functional tests with a content sink reserved by the content source;

calibrating a content sink reserved which may include but not limit to content sink screen color temperature, brightness, contrast, and audio volume;

overriding special access rights of the reserved and assigned content sinks, and overriding the reserved sink screen areas or sink sub-screen areas; and releasing the reserved content sinks, sink screen areas or sink sub-screen areas.

When the content source 500 has completed communication with all content sinks 600, 600' and 600" for a source content delivering task (to be identified as the discovery and recognition phase), the remote display management unit 520 establishes a set of mappings of a source content (or a source screen area or a source sub-screen area) to a sink screen area (or a sink sub-screen area). A source screen area (or source sub-screen area) is identified uniquely and may be assigned to one or more sink screen areas (or sink sub-screen areas). In one exemplary embodiment of the invention, the content source 500 transmits un-divided content to the content sinks 600, 600' and 600". In another exemplary embodiment, the content processing unit 530 divides the active content into multiple sections, and the content source 500 delivers a section of active content to a content sink 600 (or 600' or 600") that was mapped in the initial discovery and recognition phase. Depending on a particular source content delivering task, part or all of the source content sections may be delivered to the mapped content sinks. In another exemplary implementation, the un-divided source content is delivered (or broadcasted) to all mapped content sinks 600, 600' and 600", and each content sink processes and displays a proper source content section on its screen (or sub-screen) area based on the management information exchanged in the discovery and recognition phase. Multiple content sources may exchange management information with one or more content sinks in accordance with an embodiment of the invention. In one exemplary implementation, more than one content sources exchange management information with one content sink during discovery and recognition phase. The content sink discloses to the content sources how its display screen area can be logically divided and how many sink sub-screen areas are available. The remote display management unit of each content source selects, reserves and maps the available sub-screen areas on the content sink accordingly via certain coordination. The state of a sink sub-screen area that is reserved by one content source updates accordingly and the sink sub-screen area becomes unavailable to other content sources, unless another content source wishes to override it with higher access right. A content source can also release a reserved sink sub-screen area and make it available to other content sources.

When content sources and content sinks are ready after the discovery and recognition phase, active content is transmitted from content sources to content sinks and displayed accordingly on mapped sink screen areas or sink sub-screen areas. Based on particular exemplary embodiment of the invention, there may be a physical limitation on how many content sources can be supported by a content sink simultaneously. In another exemplary embodiment of the invention, multiple content sources can communicate with a logical display wall formed by multiple content sinks. Each content source may reserve one or more content sinks or sub-screen areas of the content sinks similar to the description above. The content processing unit 530 of a content source may divide the active content into multiple sections and transmits a section of content to a mapped screen area or a sub-screen area of a content sink. In some exemplary embodiments, a content source may also discover and communicate with other content sources to orchestrate and form a setup to achieve certain content remote delivery and display application needs. In another exemplary embodiment of the invention, a second discovery and recognition phase may happen between content source 500 and content sink (600 and/or 600' and/or 600") for delivering another active content to available (un-reserved) sink screen areas (or sink sub-screen areas) of the content sinks, while a first active content is being delivered to and displayed on a (or a set of) first reserved sink screen areas (or sink sub-screen areas) of the content sinks.

Based on the information exchanged in the discovery and recognition phase, the content processing unit 530 processes the source content by formatting and encoding the source content to be transmitted using a supported and agreed-upon media standard. In some exemplary embodiment implementations, the content processing unit 530 further divides the active content into multiple sections based on the management information exchanged. Each section is sent to the content transceiver 511 and delivered to a mapped content sink accordingly. In other exemplary embodiment implementations, active content is not divided by the content processing unit 530. The un-divided active content is sent to the content transceiver 511 and is delivered to a mapped content sink accordingly. If only a section of the active content needs to be displayed on the screen area (or sub-screen area) of the content sink, the content sink properly processes and displays the active content received.

In accordance with the above embodiment of the invention, a content processing unit 530 is provided in the content source 500. It is understood, however, that the content processing unit 530 can be replaced with another general component of the content source 500 which is modified to support all of the functions of the content processing unit 530.

The source content management unit 540 relies on the management information exchanged from the content sinks 600, 600' and 600" and manages the content processing unit 530 to properly process and format the active content to be transmitted.

Figure 3:
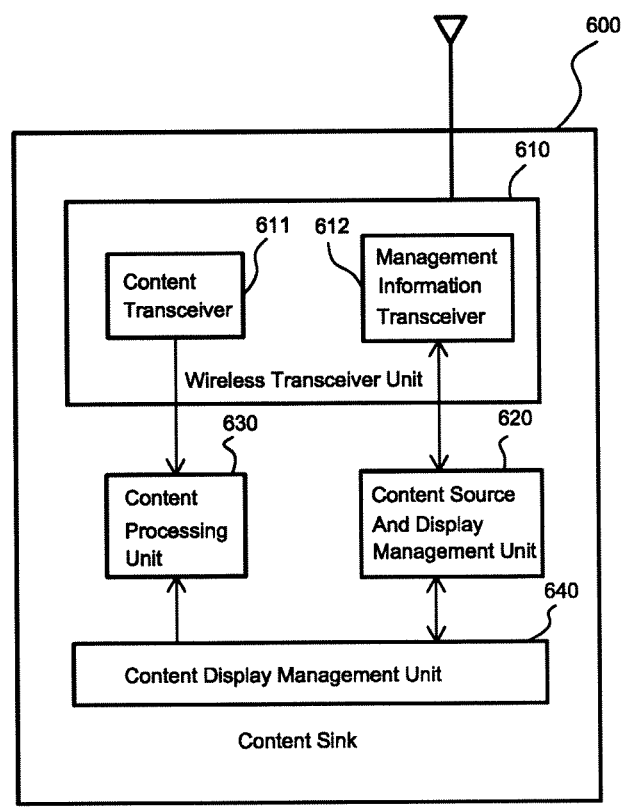
FIG. 3 is a block diagram of a content sink of the system of FIG. 1.

Referring to FIG. 3, the content sink 600 of an embodiment of the invention, in addition to the normal components that operate the content sink 600, includes a wireless transceiver unit 610, a content source and display management unit 620, a content processing unit 630, and a content display management unit 640, described in the following:

The wireless transceiver unit 610 handles physical information exchange with the content sources 500, 500' and 500" over the air. The wireless transceiver unit 610 includes a content transceiver 611 and a management information transceiver 612. The management information transceiver 612 exchanges management information with each content source 500 (500', 500") using appropriate and applicable information exchange standards to enable the content source 500 (500', 500") to identify and manage the content sink 600. The management information exchanged between a content source and a content sink, as will be described in more detail herein, also allows the content sink to properly map the source content from a content source to a screen area of the content sink. The content transceiver 611 receives active content transmitted from the content source 500 (or 500' or 500"), for decoding the active content received with appropriate industry wireless communication standards. The content transceiver 611 forwards the active content to the content processing unit 630 to perform any necessary operations before forwarding the processed active content to the content display management unit 640. The management information transceiver 612 forwards the management information to the content source 500 (or 500' or 500") and the content source and display management unit 620 to process the management information received from the content source 500 (or 500' or 500") with appropriate industry wireless communication standards. The content sink 600 may exchange information with multiple content sources 500, 500' and 500" to allow the content sources 500, 500' and 500" to manage and share the content sink 600. For instance, in an exemplary embodiment of the invention, the content sink 600 may divide its screen area into several sub-screen areas. Via management information exchanged, each content source 500 (500', 500") may identify, select and reserve one or more available sub-screen areas of the content sink 600. When each content source 500 (500', 500") delivers its active content to the content sink 600, contents from different content sources 500, 500' and 500" are displayed appropriately in the sub-screen areas of the content sink 600.

In the wireless transceiver unit 610, the content transceiver 611 may be replaced with a content receiver (not shown) for receiving active source content. That is, the wireless transceiver unit 610 may include a content receiver for receiving the active content and a management information transceiver 612 for exchanging management information that use different wireless channels (e.g. RF frequency).

The content source and display management unit 620 exchanges management information with a remote content source 500, 500' or 500", via appropriate information exchange standards or protocols. The management information supports a set of communication functions including but not limit to followings:

discovering active supporting content sources near-by;
discovering active supporting content sinks near-by;
supporting reservation of the available sink screen area;
supporting reservation of the available sink sub-screen area when applicable;
communicating and supporting desired coordination mapping between the source content (or sections of source content) and the sink screen area (or sink sub-screen areas);
communicating content source capabilities which may include but not limit to wireless protocols supported, communication security protocols supported, source screen and source content dimension and resolutions supported, source content (audio/visual) media format and compression protocols supported, and source sub-screen areas supported;
communicating content sink capabilities which may include but not limit to wireless protocols supported, communication security protocols supported, sink screen and source content dimension and resolutions supported, source content (audio/visual) media format and compression protocols supported, and sink sub-screen area supported;
communicating the orientation of active content of a content source to be delivered and being delivered;
performing communicational and audio/visual functional tests with a content source;
supporting and performing calibration functions ordered by a content source which may include but not limit to content sink screen color temperature, brightness, contrast, and audio volume;
supporting override functions to a reservation made by one content source when a second content source has special and higher access rights; and
releasing reserved content sinks, sink screen area or sink sub-screen area.

When the content sink 600 has completed communication with all content sources 500, 500' and 500" for a remote source content delivery and display task (to be identified as the discovery and recognition phase), the content source and display management unit 620 establishes a list of unique mapping between a source content (or a source screen area or a source sub-screen area) of a remote content source and a sink screen area (or a sink sub-screen area) of the content sink. Working with other units of the content sink to be described herein, active content received from the content sources 500, 500' and 500" is displayed properly on the designated sink screen area (or sink sub-screen area).

The content processing unit 630 may perform but not limit to following operations in accordance with embodiments of the invention:

decoding active content received;
dividing the full active content into sections when applicable;
scaling and orienting the active content to be displayed on the display screen of the content sink;
positioning the active content on the mapped screen area or sub-screen areas of the content sink;
formatting and processing the active content received from multiple content sources; and
formatting and encoding the received active content.

In one exemplary embodiment of the invention, a content source manages multiple content sinks and is set to display the source content to the content sinks with each content sink displaying a section of the active content from the content source. The result of the discovery and recognition phase is such that the content source transmits active content, undivided, to all content sinks. Each content processing unit 630 divides and processes the active content appropriately. In another exemplary embodiment where multiple content sources deliver sections of active content to multiple content sinks, the sections of the active content received from the content sources are processed and formatted by the content processing unit 630, forwarded to a video graphic display unit (not shown) of the content sink 600, and displayed on the sink screen area.

In accordance with the above embodiment of the invention, a content processing unit 630 is provided in the content sink 600. It is understood, however, that the content processing unit 630 can be replaced with another general component of the content sink 600, which is modified to support all of the functions of the content processing unit 630.

The content display management unit 640 relies on the management information exchanged from the remote content sources and manages the content processing unit 630 to properly process and format the active content to be displayed on the display screen (not shown). In another exemplary embodiment of the invention, a second discovery and recognition phase may happen between content sources (500 and/or 500' and/or 500") and content sink 600 for delivering another active content to available (un-reserved) sink sub-screen areas of the content sink, while a first active content is being received from content sources (500 and/or 500' and/or 500") and displayed on a (or a set of) first reserved sink sub-screen area(s) of the content sink.

Figure 4:
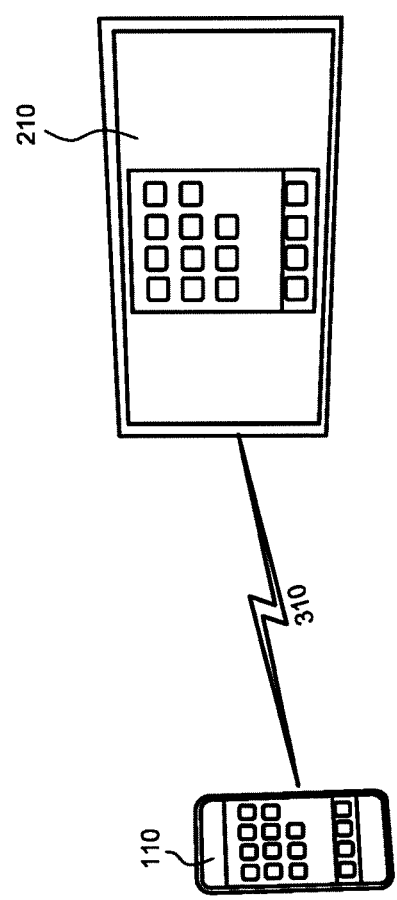
FIG. 4 depicts a first application example of the invention.

FIG. 4 depicts a first application example of the invention wherein a mobile phone (content source) 110 identifies a display device (content sink) 210. The mobile phone 110 exchanges management information with the display device 210 and transmits the active content to the display device 210 wirelessly represented by reference numeral 310. The active content is received by the display device 210 and processed. The processed active content is displayed on the display device 210 in different ways in different operation modes:

In a first operation mode, the whole active content on the mobile phone 110 is transmitted to the display device 210 and is scaled to occupy the entire screen area of the display device 210.

In a second operation mode, the whole active content on the mobile phone 110 is displayed on at least one sub-screen area of the display device 210. For example, a mobile application (such as a game) is executed in the mobile phone 110. The game content on the mobile phone 110 is displayed on one or more sub-screen areas of the display device 210. For another example, two mobile applications (such as a game and an e-mail program) are simultaneously executed in the mobile phone 110. The game content and the e-mail content on the mobile phone 110 are transmitted and displayed on different sub-screen areas of the display device 210.

In a third operation mode, at least one section of the active content (visual content that is showing on a sub screen area of the content source) on the mobile phone 110 is displayed on the entire screen area of the display device 210, wherein the active content is divided into sections by the mobile phone 110 or the display device 210.

In a fourth operation mode, at least one section of the active content on the mobile phone 110 is displayed on at least one sub-screen area of the display device 210, wherein the active content is divided into sections by the mobile phone 110 or the display device 210.

The sub-screen areas of the display device 210 selected to display the active content or sections of the active content may form various shapes. For clarification, the display device 210 has, for example, twenty sub-screen areas as shown in FIG. 5. In an operation mode, sub-screen areas 9, 10, 11, and 12 are selected to form a rectangular shape for displaying the active content (or sections of the active content) of the mobile phone 110. In another operation mode, sub-screen areas 1, 2, 5, 6, 9, and 10 are selected to form a rectangular shape for displaying first active content (or sections of the first active content); and sub-screen areas 4, 8, 12, 16, and 20 are selected to form another rectangular shape for displaying second active content (or sections of the second active content). In yet another operation mode, sub-screen areas 6, 7, 9, 12, 14, and 15 are selected to form a special shape for displaying the active content (or sections of the active content) of the mobile phone 110.

Figure 6:
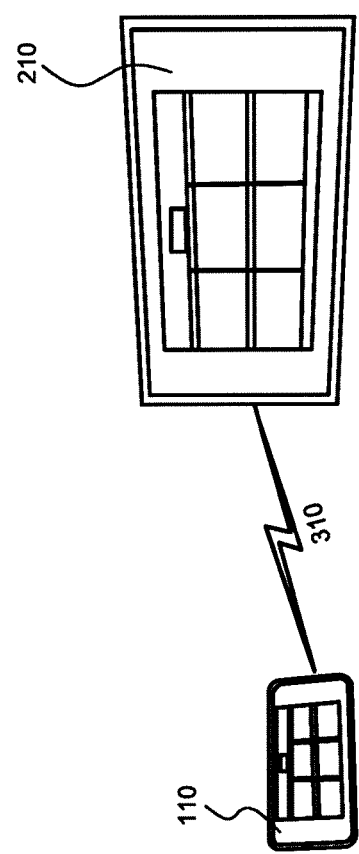
FIG. 6 depicts a second application example of the invention.

FIG. 6 depicts a second application example of the invention wherein a mobile phone (content source) 110 identifies a display device (content sink) 210. The mobile phone 110 exchanges management information with the display device 210. As part of information exchange, the mobile phone 110 also sends its content orientation to the display device 210 (the content orientation in FIG. 6 of the second application example is "horizontal" while the content orientation in FIG. 4 of the first application example is "vertical"). The mobile phone 110 transmits the active content to the display device 210 wirelessly represented by reference numeral 310. The processed active content is displayed accordingly on the display device 210.

Figure 7:
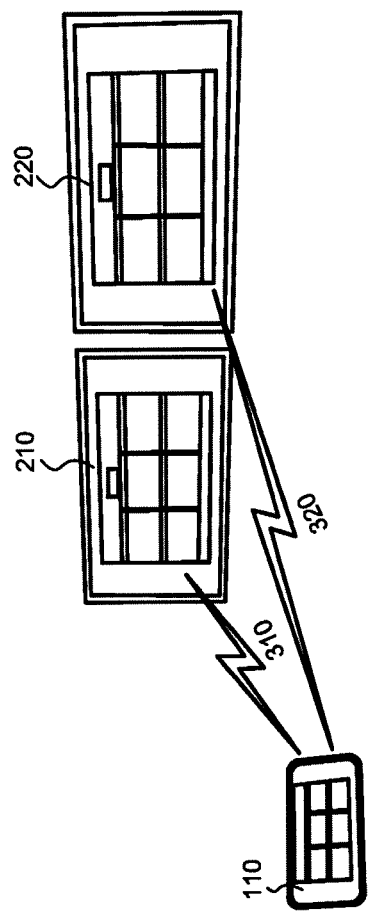
FIG. 7 depicts a third application example of the invention.

FIG. 7 depicts a third application example of the invention wherein there are a mobile phone (content source) 110 and two display devices (content sinks) 210 and 220. The mobile phone 110 identifies each of the display devices 210 and 220. The mobile phone 110 selects to display the same active content on each display device 210 and 220. The mobile phone 110 exchanges management information with each display devices 210 and 220 wirelessly represented by reference numerals 310 and 320. The mobile phone 110 transmits active content to each display device wirelessly represented by reference numerals 310 and 320. The display device 210 and 220 processes individually the active content received and the processed content is displayed accordingly on each display device 210 and 220. Both display devices 210 and 220 display the same active content.

Figure 8:
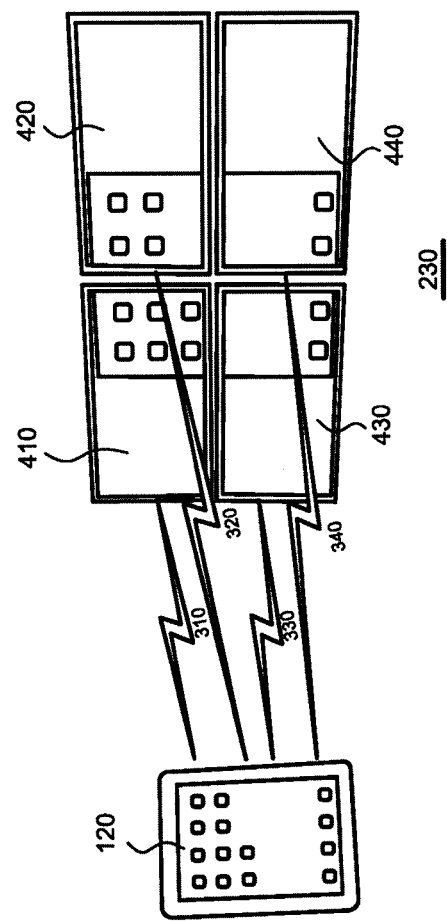
FIG. 8 depicts a fourth application example of the invention.

FIG. 8 depicts a fourth application example of the invention wherein there is a mobile tablet (content source) 120 and a logical display wall 230 consisting of four separate display devices (content sinks) 410, 420, 430 and 440. The mobile tablet 120 identifies each of the display devices 410, 420, 430 and 440 of the logical display wall 230. The mobile tablet 120 exchanges management information with each display device wirelessly represented by reference numerals 310, 320, 330 and 340. As part of information exchange, the mobile tablet 120 identifies the display wall composition and the location of each display device among the display wall composition. The mobile tablet 120 transmits the active content to each display device 410, 420, 430 and 440 wirelessly represented by reference numerals 310, 320, 330 and 340. In one exemplary implementation of the invention, the mobile tablet 120 delivers (broadcasts) the same active content to the four display devices 410, 420, 430 and 440. The display device 410, 420, 430 and 440 processes individually the active content based on management information exchanged, such as the information of their locations within the display wall composition. Each display device divides the active content into four sections and each content section is displayed on a corresponding display device. In another exemplary implementation, the mobile tablet 120 processes and divides the active content into four sections based on the management information exchanged. The mobile tablet 120 then transmits each section of the active content to a corresponding display device represented by reference numerals 310, 320, 330 and 340. The four sections of the active content are respectively processed and accordingly displayed on the display devices 410, 420, 430 and 440.

Figure 9:
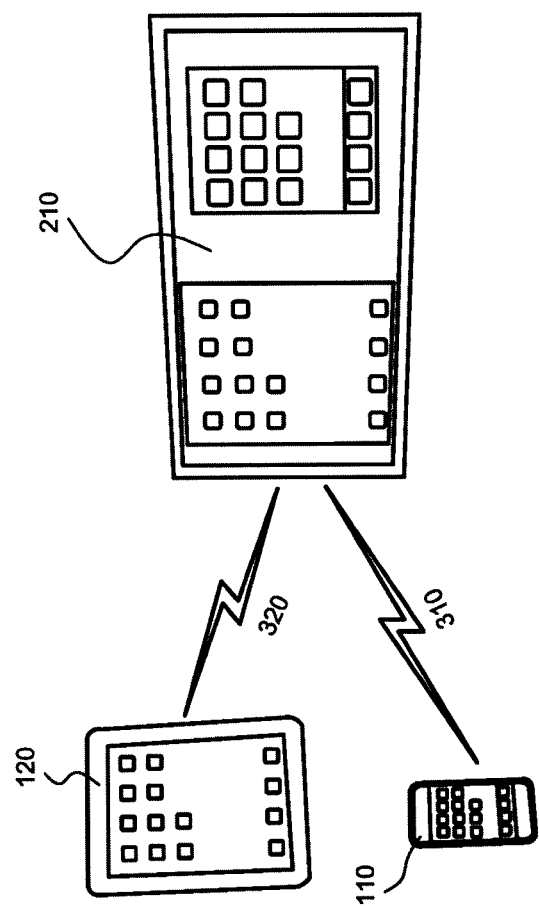
FIG. 9 depicts a fifth application example of the invention.

FIG. 9 depicts a fifth application example of the invention wherein there is a mobile phone (content source) 110, a mobile tablet (content source) 120 and a display device (content sink) 210. The mobile phone 110 identifies the display device 210 and exchanges management information with the display device 210 wirelessly represented by reference numeral 310. As part of information exchange, the mobile phone 110 identifies and reserves part of the available screen area of the display device 210 for the active content of the mobile phone 110. Similarly, the mobile tablet 120 identifies the display device 210 and exchanges management information with the display device 210 wirelessly represented by reference numeral 320. As part of information exchange, the mobile tablet 120 identifies and reserves part of the available screen area of the display device 210 for the active content of the mobile tablet 120. The display device 210 has features to prevent one screen area be reserved by more than one content sources. The mobile phone 110 and the mobile tablet 120 transmit their active content to the display device 210 wirelessly that are represented by reference numerals 310 and 320. The active content is processed and displayed accordingly on the display device 210.

Figure 10:
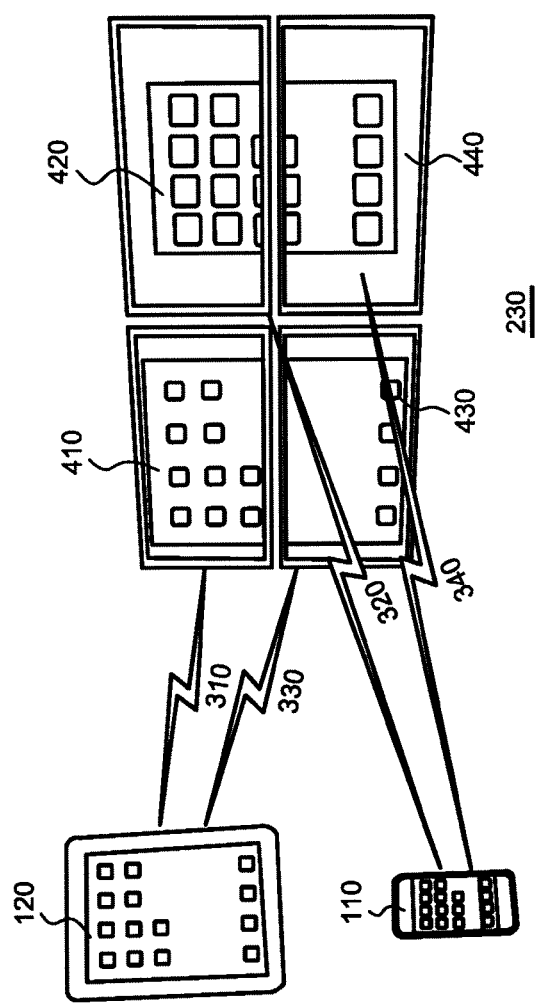
FIG. 10 depicts a sixth application example of the invention.

FIG. 10 depicts a sixth application example of the invention wherein there is a mobile phone (content source) 110, a mobile tablet (content source) 120 and a logical display wall 230 which is formed of four separate electronic display devices (content sinks) 410, 420, 430 and 440. The mobile phone 110 identifies each display device of the display wall 230 and determines to exchange management information with the two display devices 420 and 440 wirelessly represented by reference numerals 320 and 340, possibly through manual intervention. As part of information exchange, the mobile phone 110 identifies the display devices 420 and 440 composition and the locations of the display devices 420 and 440 among the composition. The mobile phone 110 transmits the active content to the display devices 420 and 440 wirelessly represented by reference numerals 320 and 340. Similarly, the mobile tablet 120 identifies each display device of the display wall 230 and determines to exchange management information with the display devices 410 and 430 wirelessly represented by reference numerals 310, 330, possibly through manual intervention. As part of information exchange, the mobile tablet 120 identifies the display device 410 and 430 composition and the locations of the display devices 410 and 430 among the composition. The mobile tablet 120 transmits the active content to the display screen 410 and 430 wirelessly represented by reference numerals 310 and 330. Each display device processes individually the active content received with the information of its location within the proper display device composition. As shown, the processed content sections are displayed accordingly on each display device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, comprising:
   providing a content source which comprises a source screen area;
   providing a content sink which comprises a first sink sub-screen area and a second sink sub-screen area;
   wirelessly exchanging management information between the content source and the content sink, for the content source to identify and manage the content sink via the management information;
   choosing the first sink sub-screen area by the content source;
   transmitting first active content from the content source to the content sink; and
   displaying the first active content on the first sink sub-screen area.

2. The method as claimed in claim 1, further comprising establishing coordination mapping between the source screen area and the first sink sub-screen area before the first active content is transmitted to the content sink.

3. The method as claimed in claim 2, further comprising establishing coordination mapping between the first active content and the first sink sub-screen area before the first active content is transmitted to the content sink.

4. The method as claimed in claim 1, further comprising choosing the second sink sub-screen area by the content source, transmitting second active content from the content source to the content sink, and displaying the second active content on the second sink sub-screen area.

5. The method as claimed in claim 1, wherein the management information includes an orientation of the content source.

6. A method, comprising:
   providing a content source which comprises a plurality of source sub-screen areas;
   providing a content sink which comprises a sink screen area including a plurality of sink sub-screen areas;
   wirelessly exchanging management information between the content source and the content sink, for the content source to identify and manage the content sink via the management information;
   generating active content by the content source;
   dividing the active content into a first section and a second section; and
   displaying the first section of the active content on the content sink.

7. The method as claimed in claim 6, further comprising establishing coordination mapping between one of the source sub-screen areas and the sink screen area via the management information.

8. The method as claimed in claim 7, further comprising establishing coordination mapping between the first section of the active content and the sink screen area.

9. The method as claimed in claim 6, further comprising choosing one of the sink sub-screen areas by the content source, and displaying the first section of the active content on the chosen one of the sink sub-screen areas.

10. The method as claimed in claim 9, further comprising establishing coordination mapping between one of the source sub-screen areas and the chosen one of the sink sub-screen areas.

11. The method as claimed in claim 10, further comprising establishing coordination mapping between the first section of the active content and the chosen one of the sink sub-screen areas.

12. The method as claimed in claim 6, wherein the management information includes an orientation of the content source.

13. A content source, comprising:
   a wireless transceiver unit;
   a remote display management unit exchanging management information with a plurality of content sinks through the wireless transceiver unit to identify and manage the content sinks;
   a content processing unit processing active content; and
   a source content management unit relying on the management information and managing the content processing unit to process the active content, wherein the processed active content is transmitted to the content sinks through the wireless transceiver unit.

14. The content source as claimed in claim 13, wherein the content sinks include sink screen areas, and the remote display management unit selects and reserves at least one of the content sinks and at least one of the sink screen areas via the management information.

15. The content source as claimed in claim 14, wherein the remote display management unit sets coordination mapping between the active content and the at least one of the sink screen areas via the management information.

16. The content source as claimed in claim 14, wherein the remote display management unit releases the reserved at least one of the sink screen areas via the management information.

17. The content source as claimed in claim 13, wherein the content sinks include a plurality of sink sub-screen areas, and the remote display management unit selects and reserves at least one of the sink sub-screen areas via the management information.

18. The content source as claimed in claim 17, wherein the remote display management unit sets coordination mapping between the active content and the at least one of the sink sub-screen areas via the management information.

19. The content source as claimed in claim 17, wherein the remote display management unit releases the reserved at least one of the sink sub-screen areas via the management information.

20. The content source as claimed in claim 13, wherein the management information includes an orientation of the active content.

21. The content source as claimed in claim 13, wherein the content sinks form a display wall, and the management information includes locations of the content sources within display wall composition.

22. The content source as claimed in claim 13, wherein the content processing unit divides the active content into a plurality of sections, and the sections of the active content are transmitted to at least one of the content sinks through the wireless transceiver unit.

23. The content source as claimed in claim 13, wherein the wireless transceiver unit includes a transceiver exchanging the management information with the content sinks, and a transmitter transmitting the active content to the content sinks.

24. The content source as claimed in claim 13, wherein the content source is a mobile phone, a tablet computer, or a laptop computer.

25. A content sink, comprising:
a wireless transceiver unit;
a content source and display management unit exchanging management information with a plurality of content sources through the wireless transceiver unit, for the content sources to identify and manage the content sink;
a content processing unit receiving active content from the content sources through the wireless transceiver unit; and
a content display management unit relying on the management information and managing the content processing unit to process and format the active content.

26. The content sink as claimed in claim 25, further comprising a sink screen area, wherein the content source and display management unit enables the content sources to select and reserve the sink screen area via the management information.

27. The content sink as claimed in claim 26, wherein the content source and display management unit enables the content sources to set coordination mapping between the active content and the sink screen area via the management information.

28. The content sink as claimed in claim 26, wherein the content source and display management unit enables the content sources to override the reserved sink screen area via the management information.

29. The content sink as claimed in claim 25, further including a plurality of sink sub-screen areas, and the content source and display management unit enables the content sources to select and reserve the sink sub-screen areas via the management information.

30. The content sink as claimed in claim 29, wherein the content source and display management unit enables the content sources to set coordination mapping between the active content and the sink sub-screen areas via the management information.

31. The content sink as claimed in claim 29, wherein the content source and display management unit enables the content sources to override the reserved sink sub-screen areas via the management information.

32. The content sink as claimed in claim 25, wherein the management information includes an orientation of the active content.

33. The content sink as claimed in claim 25, wherein the content processing unit divides the active content into a plurality of sections.

34. The content sink as claimed in claim 25, wherein the wireless transceiver unit includes a transceiver exchanging the management information with the content sources, and a receiver receiving the active content from the content sources.

35. The content sink as claimed in claim 25, wherein the content sink is an electronic display or a projector.

36. A method, comprising:
wirelessly exchanging first management information between a content source and a first content sink, for the content source to identify and manage the first content sink via the first management information;
transmitting first active content from the content source to the first content sink;
displaying the first active content on the first content sink;
wirelessly exchanging second management information between the content source and a second content sink, for the content source to identify and manage the second content sink via the second management information;
transmitting second active content from the content source to the second content sink; and
displaying the second active content on the second content sink.

37. A method, comprising:
providing a content sink which comprises a first sink sub-screen area and a second sink sub-screen area;
wirelessly exchanging first management information between a first content source and the content sink, for the first content source to identify and manage the content sink via the first management information;
choosing the first sink sub-screen area by the first content source;
transmitting first active content from the first content source to the content sink;
displaying the first active content on the first sink sub-screen area of the content sink;
wirelessly exchanging second management information between a second content source and the content sink, for the second content source to identify and manage the content sink via the second management information;
choosing the second sink sub-screen area by the second content source;
transmitting second active content from the second content source to the content sink; and
displaying the second active content on the second sink sub-screen area of the content sink.

* * * * *